(12) United States Patent
Ako

(10) Patent No.: US 8,335,680 B2
(45) Date of Patent: Dec. 18, 2012

(54) ELECTRONIC APPARATUS WITH DICTIONARY FUNCTION BACKGROUND

(75) Inventor: Takuya Ako, Tachikawa (JP)

(73) Assignee: Casio Computer Co., Ltd, Tokyo (JP)

( * ) Notice: Subject to any disclaimer, the term of this patent is extended or adjusted under 35 U.S.C. 154(b) by 154 days.

(21) Appl. No.: 12/784,865

(22) Filed: May 21, 2010

(65) Prior Publication Data

US 2010/0312544 A1    Dec. 9, 2010

(30) Foreign Application Priority Data

Jun. 5, 2009   (JP) ................................. 2009-136577

(51) Int. Cl.
  *G06F 17/28* (2006.01)
(52) U.S. Cl. ........................ 704/3; 704/4; 704/9; 704/10
(58) Field of Classification Search ......................... None
  See application file for complete search history.

(56) References Cited

U.S. PATENT DOCUMENTS

| | | | | |
|---|---|---|---|---|
| 5,845,305 | A * | 12/1998 | Kujiraoka | 715/234 |
| 6,346,990 | B1 * | 2/2002 | Watanabe et al. | 358/1.15 |
| 6,522,347 | B1 * | 2/2003 | Tsuji et al. | 715/848 |
| 6,636,162 | B1 * | 10/2003 | Kushler et al. | 341/28 |
| 7,136,803 | B2 * | 11/2006 | Kida et al. | 704/3 |
| 2004/0268256 | A1 * | 12/2004 | Furuta et al. | 715/531 |

FOREIGN PATENT DOCUMENTS

| | | |
|---|---|---|
| JP | 62-015654 | 1/1987 |
| JP | 11-161641 | 6/1999 |
| JP | 2005-157472 | 6/2005 |
| JP | 2007-317163 | 12/2007 |
| JP | 2008-250796 | 10/2008 |
| KR | 2001-0067827 | 7/2001 |
| KR | 1020070104084 A | 10/2007 |

OTHER PUBLICATIONS

Japanese Office Action for Japanese Application No. 2009-136577 mailed on Mar. 6, 2012.
Korean Office Action for Application No. 10-2010-0049394 mailed on May 31, 2011.
Japanese Office Action dated Feb. 8, 2011 corresponding to U.S. Appl. No. 12/784,865, filed May 21, 2010.
Japanese Office Action for Application No. 2009-136577 mailed on May 10, 2011.
Korean Office Action for Korean Application No. 9-5-2012-037397581 mailed on Jun. 27, 2012.

* cited by examiner

*Primary Examiner* — Leonard Saint Cyr
(74) *Attorney, Agent, or Firm* — Turocy & Watson, LLP

(57) ABSTRACT

An electronic apparatus comprises a display device, an input unit, a storage, and a processor. The processor accepts the input of a reading in the second language via the input unit, reads a kanji character in the second language corresponding to the input reading in the second language from the reading-kanji correspondence information stored in the storage, reads a kanji character in the first language corresponding to the read kanji character in the second language from the kanji correspondence information stored in the storage and performs display control of the read kanji character on the display device, and reads explanatory information that uses a character string including the kanji character in the first language subjected to display control as an entry word from dictionary information stored in the storage and performs display control of the explanatory information on the display device.

7 Claims, 13 Drawing Sheets

FIG.3

COUNTRY-SPECIFIC KANJI CORRESPONDENCE TABLE 22c

| UNICODE | SJIS CODE (JAPANESE) | JAPANESE KANJI | GB CODE (CHINESE) | CHINESE KANJI | KSC CODE (KOREAN) | KOREAN KANJI |
|---|---|---|---|---|---|---|
| 5496 | 87FB | 咖 | BFA7 | 咖 | - | 咖 |
| 5561 | F1A6 | 啡 | AC69 | 啡 | - | 啡 |
| 55AB | 8B69 | 喫 | 86CB | 喫 | D1D2 | 喫 |
| 5E97 | 9358 | 店 | B5EA | 店 | EFC1 | 店 |
| 623F | 965B | 房 | B7BF | 房 | DBAE | 房 |
| 73C8 | E0DB | 珈 | E7EC | 珈 | - | - |
| 7432 | E0E8 | 琲 | AC69 | 琲 | - | - |
| 8218 | 8ADA | 舘 | C56F | 舘 | - | - |
| 8336 | 9283 | 茶 | B2E8 | 茶 | D2FE | 茶 |

FIG.4A

JAPANESE READING-KANJI CORRESPONDENCE TABLE 22dj

| JAPANESE KANJI | JAPANESE READING |
|---|---|
| 咖 | カ |
| 啡 | ハイ, ヒ |
| 喫 | キツ |
| 店 | テン, ミセ |
| 房 | ボウ, フサ |
| 珈 | カ, ケ |
| 琲 | ハイ, バイ |
| 舘 | カン |
| 茶 | チャ |
| 喫茶 | キッサ |
| 珈琲 | コーヒー |

FIG.4B

CHINESE READING-KANJI CORRESPONDENCE TABLE 22dc

| CHINESE KANJI | CHINESE READING |
|---|---|
| 咖 | kā, gā |
| 啡 | fēi |
| 喫 | chī |
| 店 | dian |
| 房 | fang |
| 珈 | jiā |
| 琲 | bei |
| 舘 | guan |
| 茶 | cha |

FIG.4C

KOREAN READING-KANJI CORRESPONDENCE TABLE 22dk

| KOREAN KANJI | KOREAN READING |
|---|---|
| 咖 | 가 |
| 啡 | 배 |
| 喫 | 끽 |
| 店 | 점 |
| 房 | 방 |
| 茶 | 차 |

FIG.5

MULTIPLE KANJI CORRESPONDENCE TABLE 22e

| JAPANESE KANJI | CHINESE KANJI | KOREAN KANJI |
|---|---|---|
| 珈琲 | 咖啡 | 咖啡 |

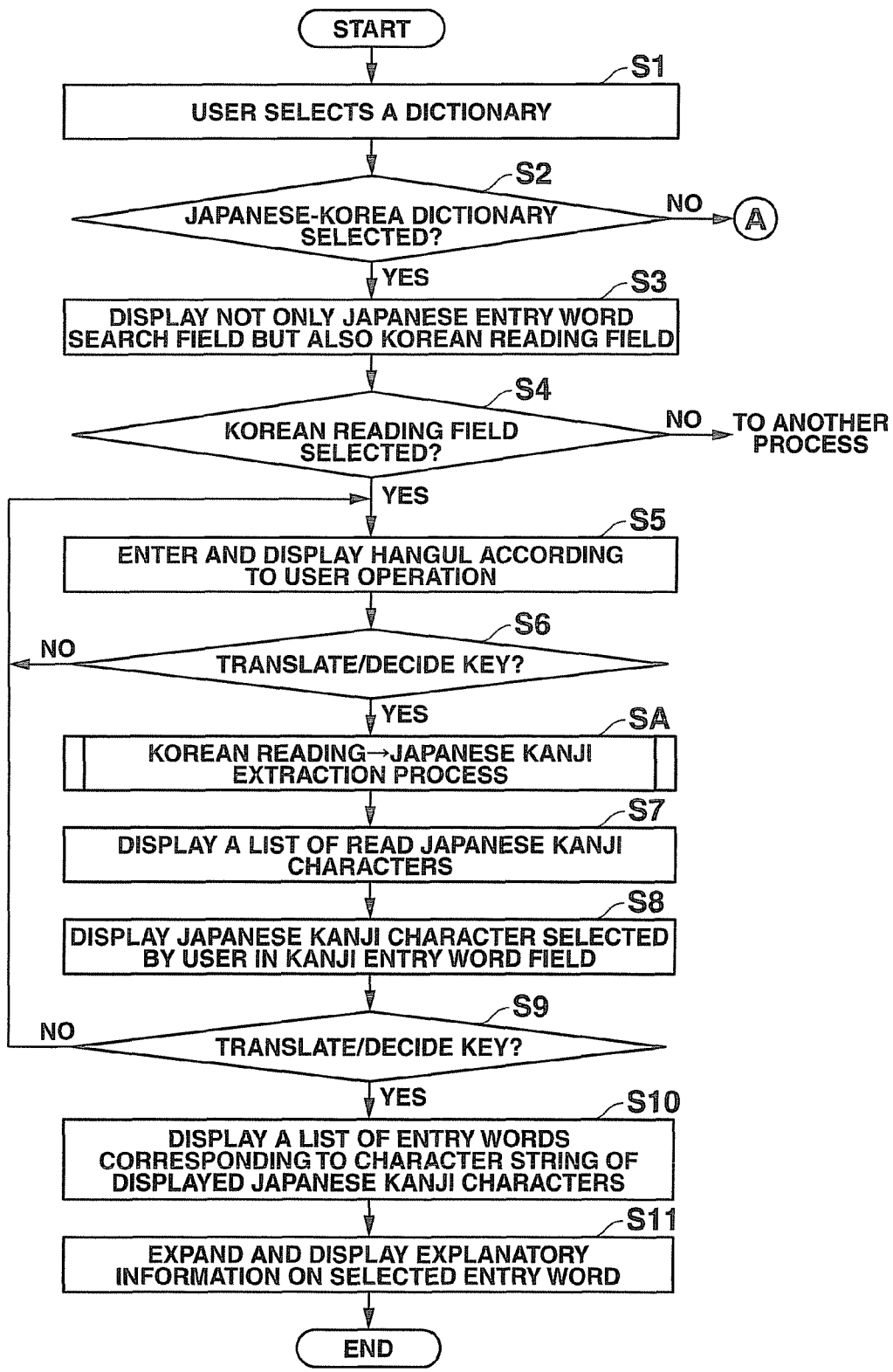

ELECTRONIC APPARATUS WITH DICTIONARY FUNCTION BACKGROUND

CROSS-REFERENCE TO RELATED APPLICATIONS

This application is based upon and claims the benefit of priority from prior Japanese Patent Application No. 2009-136577, filed Jun. 5, 2009, the entire contents of which are incorporated herein by reference.

BACKGROUND OF THE INVENTION

1. Field of the Invention

This invention relates to an electronic apparatus with a dictionary function of searching for explanatory information in a language using kanji characters and to a program for achieving the dictionary function.

2. Description of the Related Art

When a word is retrieved from the dictionary contents in a certain language, the word is basically searched for only with a keyword in the language.

To overcome the shortcoming, the following electronic dictionary has been considered: when pronunciation (synonymous with reading) in a target language is known, entering the pronunciation of a word in the target language according to the notational system of the user's mother tongue on the electronic dictionary enables the word in the target language to be searched for in conformity with the conversion rule of phonetic representation. One example of such an electronic dictionary has been disclosed in Jpn. Pat. Appln. KOKAI Publication No. 2007-317163.

With the conventional electronic dictionary, the pronunciation of a word in the target language still has to be known. Suppose the target language is, for example, Japanese. If a word to be searched for is a hiragana word or a katakana word, it is relatively easy to enter its pronunciation. However, if a word to be searched for is a kanji word, the word cannot be searched for by entering its pronunciation unless how the kanji word is pronounced in Japanese is known. In this case, means for searching for a word is limited to the way a kanji word is input with the help of handwritten character recognition or the like.

However, it has not been easy for users unfamiliar with Japanese to enter kanji words by hand. Moreover, it has been difficult to realize the idea that they write kanji words by hand on an electronic dictionary without a handwriting panel.

BRIEF SUMMARY OF THE INVENTION

An object of the invention is to provide an electronic apparatus with a dictionary function which enables a targeted kanji word to be searched for by inputting the pronunciation of the kanji word in the user's mother tongue even if how the kanji word is pronounced in a target language is unknown and a computer-readable medium which includes a program for achieving the dictionary function.

According to a first aspect of the invention, there is provided an electronic apparatus comprising: a display device; an input unit; a storage which includes dictionary information that causes an entry word in a first language to correspond to explanatory information in a second language, reading-kanji correspondence information that causes a kanji character in the second language to correspond to a reading in the second language, and kanji correspondence information that causes a kanji character in the first language to correspond to a kanji character in the second language; a processor which accepts the input of a reading in the second language via the input unit, reads a kanji character in the second language corresponding to the input reading in the second language from the reading-kanji correspondence information stored in the storage, reads a kanji character in the first language corresponding to the read kanji character in the second language from the kanji correspondence information stored in the storage and performs display control of the read kanji character on the display device, and reads explanatory information that uses a character string including the kanji character in the first language subjected to display control as an entry word from dictionary information stored in the storage and performs display control of the explanatory information on the display device.

According to a second aspect of the invention, there is provided an electronic apparatus comprising: a display device; an input unit; a dictionary storage which stores dictionary information that causes an entry word in a first language to correspond to explanatory information in a second language; a reading-kanji correspondence storage which stores reading-kanji correspondence information that causes a kanji character in the second language to correspond to a reading in the second language; a kanji correspondence storage which stores kanji correspondence information that causes a kanji character in the first language to correspond to a kanji character in the second language; a second-language reading input section which takes in a reading in the second language via the input unit; a first language kanji display section which reads a kanji character in the second language corresponding to the reading in the second language input by the second language reading input section from the reading-kanji correspondence information stored in the reading-kanji correspondence storage, then reads a kanji character in the first language corresponding to the kanji character in the second language from the kanji correspondence information stored in the kanji correspondence storage, and performs display control of the read kanji character on the display device; and a dictionary information display section which reads explanatory information that uses a character string including the kanji character in the first language subjected to display control at the first-language kanji display section as an entry word from dictionary information stored in the dictionary storage and performs display control of the explanatory information on the display device.

According to a third aspect of the invention, there is provided a computer-readable medium which stores a software program that is executed by a computer system with a display device and that comprises a series of instructions to cause the computer system to perform the following processes comprising: accepting the input of a reading in a second language; reading a kanji character in the second language corresponding to the input reading in the second language from information that causes the kanji character in the second language to correspond to the reading in the second language; reading a kanji character in a first language corresponding to the read kanji character in the second language from information that causes the kanji character in the first language to correspond to the kanji character in the second language and performing display control of the read kanji character on the display device; and reading explanatory information that uses a character string including the kanji character in the first language subjected to display control as an entry word from information that causes the entry word in the first language to correspond to explanatory information in the second language and performing display control of the explanatory information on the display device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a country-specific kanji correspondence table 22c stored in a main storage unit 22 of the electronic dictionary apparatus 10;

FIG. 4A is a Japanese reading-kanji correspondence table 22dj stored in the main storage unit 22 of the electronic dictionary apparatus 10;

FIG. 4B is a Chinese reading-kanji correspondence table 22dc stored in the main storage unit 22 of the electronic dictionary apparatus 10;

FIG. 4C is a Korean reading-kanji correspondence table 22dk stored in the main storage unit 22 of the electronic dictionary apparatus 10;

FIG. 5 is a multiple kanji correspondence table 22e stored in the main storage unit 22 of the electronic dictionary apparatus 10;

FIG. 6 is a flowchart to explain a dictionary search process when a Japanese-Korean dictionary has been selected on the electronic dictionary apparatus 10;

DETAILED DESCRIPTION OF THE INVENTION

Hereinafter, an embodiment of the invention will be explained with reference to the accompanying drawings.

Figure 1:
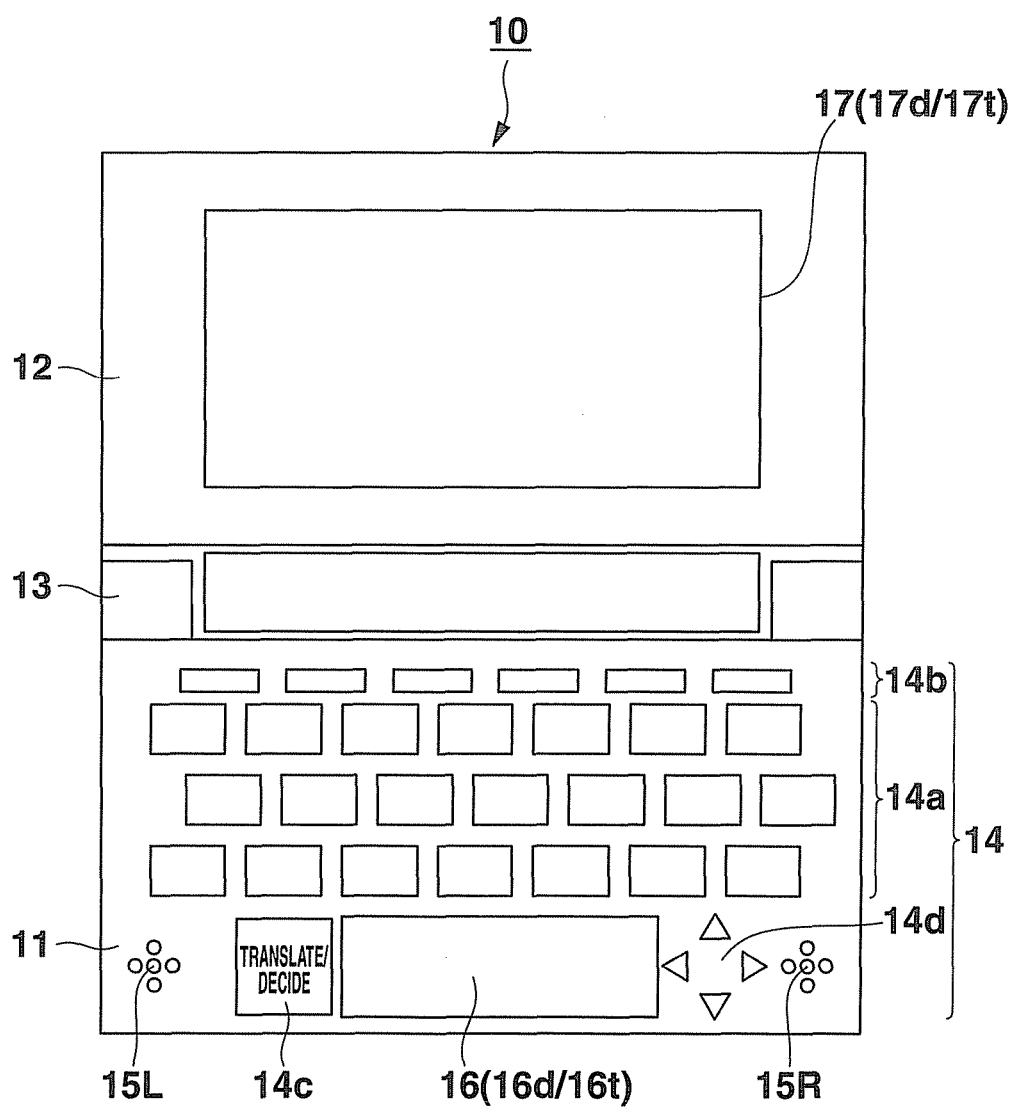
FIG. 1 is a front view showing an outer configuration of an electronic dictionary apparatus 10 according to an embodiment of an electronic apparatus with a dictionary function of the invention.

FIG. 1 is a front view showing an outer configuration of an electronic dictionary apparatus 10 according to an embodiment of an electronic apparatus with a dictionary function of the invention.

The electronic apparatus with a dictionary function is configured as a portable device for an electronic dictionary only (or an electronic dictionary apparatus 10) explained below. Alternatively, the electronic apparatus may be configured as a personal digital assistant (PDA), a personal computer (PC), a mobile phone, an e-book reader, a portable game console, or the like, each with a dictionary function.

The electronic dictionary apparatus 10 is configured to have a folding case which enables a body case 11 and a cover case 12 to be opened and closed via a hinge part 13. At the surface of the body case 11 with the folding case opened, there are provided a key input unit (keyboard) 14 and a handwriting input unit (subscreen) 16. The key input unit 14 includes character input keys 14a, dictionary specify keys 14b, Translate/Decide key 14C, cursor keys 14d, and speakers 15L, 15R.

The handwriting input unit (subscreen) 16 has a structure into which a touch position detection device and a display device are integrated. The touch position detection device detects the position touched by the user with a pen, his or her finger, or the like. The handwriting input unit (subscreen) 16 is configured to have, for example, a transparent touch panel 16t overlaid on a 256-×64-dot liquid-crystal screen 16d on the center front side of the key input unit 14. The input area of the handwriting input unit 16 is switched between a handwriting character (kanji) input area for inputting handwritten characters, a button input area for various functions, and a mixed area of various input areas as needed.

A track resulting from handwriting input with the handwriting input unit 16 switched to the handwriting character input area echoes back to the liquid-crystal screen, which displays the track.

At the surface of the cover case 12, there is provided, for example, a 480-×320-dot touch panel display unit (main screen) with backlighting 17 so as to cover almost the entire surface. Like the handwriting input unit (subscreen) 16, the touch panel display unit (main screen) 17 also has a structure into which a touch position detection device and a display device are integrated. The touch position detection device detects the position touched by the user with a pen, his or her finger, or the like. The touch panel display unit 17 is configured to have a transparent touch panel 17t laid on the liquid-crystal screen 17d.

Figure 2:
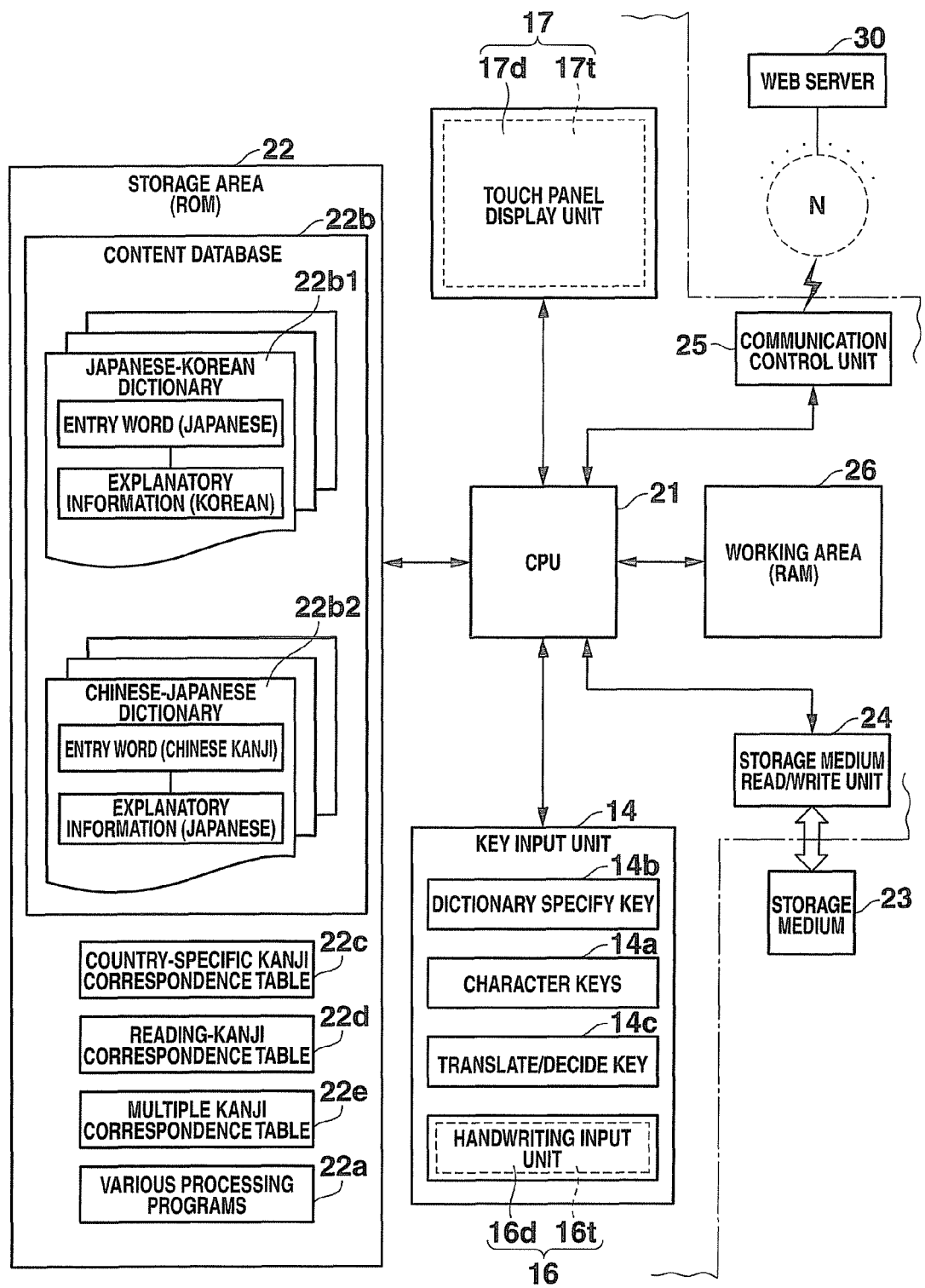
FIG. 2 is a block diagram showing a configuration of the electronic circuit of the electronic dictionary apparatus 10 according to the embodiment.

FIG. 2 is a block diagram showing a configuration of the electronic circuit of the electronic dictionary apparatus 10.

The electronic dictionary apparatus 10 is composed of a computer which reads programs recorded in various storage media or transmitted programs and whose operation is controlled by the read programs. The electronic circuit of the computer is provided with a central processing unit (CPU) 21.

According to an apparatus control program stored in the main storage unit (flash ROM) 22, the CPU 21 controls the operation of each part of the circuit using a RAM 26 as a working memory. The apparatus control program includes, for example, a program previously stored in the main storage unit 22, a program read into the main storage unit 22 from an external storage medium 23, such as a ROM card, via a storage medium read/write unit 24, and a program read into the main storage unit 22 from a Web server (in this case, a program server) 30 on the Internet via a communication control unit 25.

The apparatus control program stored in the main storage unit 22 is activated in response to a communication signal. The communication signal includes, for example, an input signal corresponding to user operation on the key input unit 14, a communication signal exchanged with each Web server 30, . . . on the Internet N connected via the communication control unit 25, and a connection communication signal with a memory card (storage medium) 23, such as an EEPROM, RAM, or ROM, externally connected via the storage medium read/write unit 24.

Connected to the CPU 21 are the main storage unit 22, storage medium read/write unit 24, communication control unit 25, RAM 26, key input unit 14, touch panel display unit 17, and the like.

The apparatus control program stored in the main storage unit 22 includes a system program that supervises the overall operation of the electronic dictionary apparatus 10 and a communication program that is for performing data communication with each Web server 30 . . . on the Internet via the communication control unit 25 or with a user personal computer (PC) (not shown). The apparatus control program includes various processing programs 22a for controlling all of the search processes on the basis of dictionary databases (22b to 22e) stored in the main storage unit 22, including an entry word search process of searching for an entry word according to the input of a search string and the process of reading and displaying various pieces of explanatory information, including a translation, a description, and an example sentence (usage example) corresponding to the retrieved entry word.

The dictionary database (22b to 22e) include a content database 22b, a country-specific kanji correspondence table 22c (see FIG. 3), reading-kanji correspondence tables 22d (see FIGS. 4A to 4C), and a multiple kanji correspondence table 22e (see FIG. 5).

The content database 22b includes a plurality of dictionary contents 22b1, 22b2, . . . previously downloaded and stored.

For example, there are a Japanese-Korean dictionary database 22b1 where Korean explanatory information is written so as to correspond to Japanese entry words (when an entry word includes a kanji character, its Japanese reading is also included) and a Chinese-Japanese dictionary database 22b2 where Japanese explanatory information is written so as to correspond to Chinese entry words (including its Chinese reading).

FIG. 3 is a country-specific kanji correspondence table 22c stored in the main storage unit 22 of the electronic dictionary apparatus 10.

In the country-specific kanji correspondence table 22c, Japanese kanji, Chinese kanji, and Korean kanji corresponding to Japan, China, and Korea, respectively, which use kanji characters in their languages are stored so as to correspond to common Unicode.

FIGS. 4A to 4C show the reading-kanji correspondence tables 22d stored in the main storage unit 22 of the electronic dictionary apparatus 10.

The reading-kanji correspondence table 22d includes the Japanese reading-kanji correspondence table 22dj (FIG. 4A) where a Japanese kanji character is written so as to correspond to its Japanese reading (katakana (or hiragana), the Chinese reading-kanji correspondence table 22dc (FIG. 4B) where a Chinese kanji character is written so as to correspond to its Chinese reading (pinyin), and the Korean reading-kanji correspondence table 22dk (FIG. 4C) where a Korean kanji character is written so as to correspond to its Korean reading (Hangul).

FIG. 5 is a multiple kanji correspondence table 22e stored in the main storage unit 22 of the electronic dictionary apparatus 10.

In the multiple kanji correspondence table 22e, synonymous phrases in Japanese kanji, Chinese kanji, and Korean kanji are caused to correspond to one another.

The RAM 26 has a storage area for display data corresponding to the display screen of the display unit 17. The storage area includes a display memory where data to be displayed on the display screen is expanded and stored as pattern data for a bit map, an input character memory where input data, such as characters, numbers, or symbols input by the user from the key input unit 14, is stored according to the various processing programs 22a, a search result memory where the entry words and explanatory information subjected to a dictionary search process are stored, and a work memory where various pieces of data input and output to and from the CPU 21 according to the various processing programs 22a are stored as needed.

Next, the dictionary search function of the electronic dictionary apparatus 10 configured as described above will be explained.

FIG. 6 is a flowchart to explain a dictionary search process when a Japanese-Korean dictionary has been selected on the electronic dictionary apparatus 10.

Figure 7:
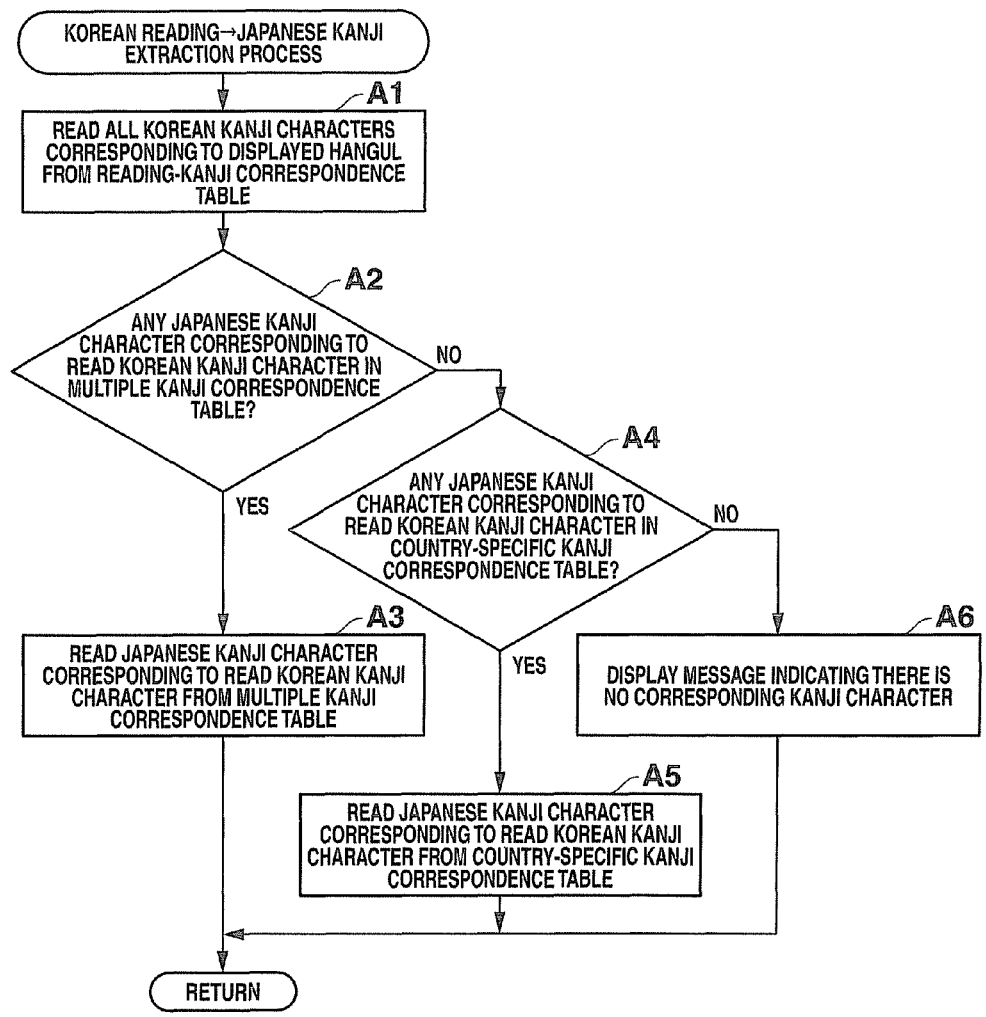
FIG. 7 is a flowchart to explain a Korean reading (Hangul) →Japanese kanji extraction process involved in a dictionary search process when a Japanese-Korean dictionary has been selected on the electronic dictionary apparatus 10.

FIG. 7 is a flowchart to explain a Korean reading (Hangul) →Japanese kanji extraction process involved in a dictionary search process when a Japanese-Korean dictionary has been selected on the electronic dictionary apparatus 10.

FIGS. 8A to 8K show display operations involved in a dictionary search process when a Japanese-Korean dictionary has been selected on the electronic dictionary apparatus 10.

Explanation will be given using the following concrete example: a user whose mother tongue is Korean selects Japanese as a target language and searches a Japanese-Korean dictionary for the Japanese kanji word "喫茶店" the meaning of which is unknown to the user. The Japanese kanji "喫茶店" is pronounced as "kiku cha chomu" in Korean (Hangul).

Figure 8A:
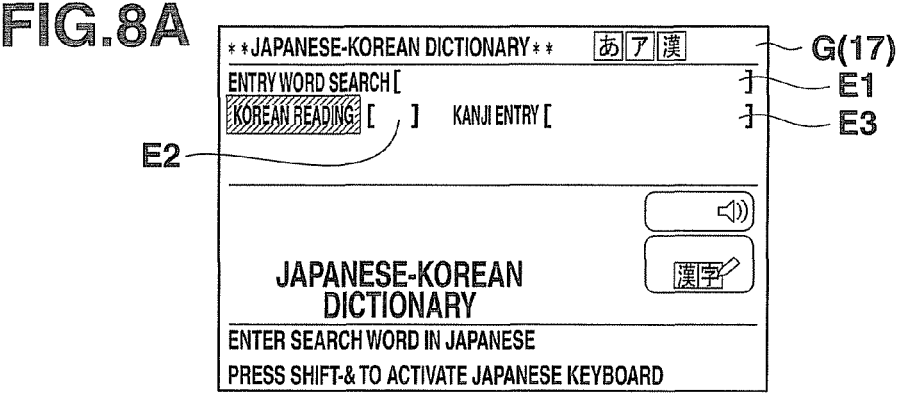
FIG. 8A shows display operation (1) involved in a dictionary search process when a Japanese-Korean dictionary has been selected on the electronic dictionary apparatus 10.

When the Japanese-Korean dictionary (22b1) is selected by pressing the dictionary specify key 14b (YES in steps S1 and S2), a search character input screen G is displayed on the touch panel display unit 17 as shown in FIG. 8A (step S3). The search character input screen G includes an entry word search area E1 for entering a search character in Japanese, a Korean reading input area E2 for entering each character of a word to be searched for (Japanese kanji word) in Korean reading (Hangul reading), and a kanji entry area E3 where a search string for a Japanese kanji character corresponding to the Korean reading of the search character input in the Korean reading input area E2 is displayed.

Figure 8B:
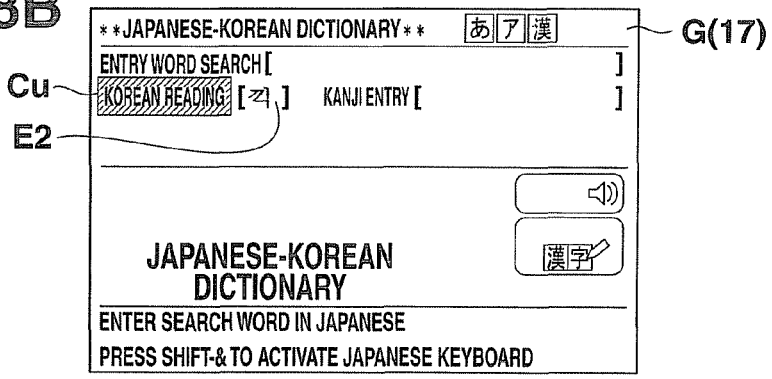
FIG. 8B shows display operation (2) involved in the dictionary search process when the Japanese-Korean dictionary has been selected on the electronic dictionary apparatus 10.

On the search character input screen G, the Korean reading input area E2 is selected with a highlighted cursor Cu as shown in FIG. 8B (YES in step S4) and the first kanji character "喫" in the Japanese kanji word "喫茶店" to be searched for is entered and displayed in Hangul as "kiku" in Korean reading (step S5).

When Translate/Decide key 14c is pressed (YES in step S6), control is passed to a Korean reading→Japanese kanji extraction process in FIG. 7 (step SA).

In the Korean reading→Japanese kanji extraction process, first, all of the Korean kanji characters corresponding to "kiku" in Korean reading entered and displayed on the Korean reading input area E2 are read from the Korean reading-kanji correspondence table 22dk (see FIG. 4C) (step A1).

It is determined whether the Japanese kanji character corresponding to the Korean kanji character read from the Korean reading-kanji correspondence table 22dk is in the multiple kanji correspondence table 22e (see FIG. 5) (step A2).

Since the Korean kanji character read from the Korean reading-kanji correspondence table 22dk is a single kanji character, it is determined that there is no Japanese kanji phrase corresponding to the Korean kanji character in the multiple kanji correspondence table 22e (NO in step A2). Then, it is determined whether there is any Japanese kanji character corresponding to the read Korean kanji character in the country-specific kanji correspondence table 22c (see FIG. 3) (step A4).

If it has been determined that there is a Japanese kanji character corresponding to the read Korean kanji character in the country-specific kanji correspondence table 22c (YES in step A4), the Japanese kanji character corresponding to the read Korean kanji character is read from the country-specific kanji correspondence table 22c (step A5).

In step A2, if it has been determined that the Korean kanji word read from the Korean reading-kanji correspondence table 22dk is composed of a plurality of kanji characters and a Japanese kanji phrase corresponding to the word is in the multiple kanji correspondence table 22e (YES in step A2), the Japanese kanji phrase corresponding to the Korean kanji word read from the multiple kanji correspondence table 22e is read (step A3).

If it has been determined that the Japanese kanji phrase corresponding to the read Korean kanji word is in neither the multiple kanji correspondence table 22e nor the country-specific kanji correspondence table 22c (NO in step A2 and NO in step A4), the message that there is no corresponding Japanese kanji character is displayed (step A6).

Figure 8C:
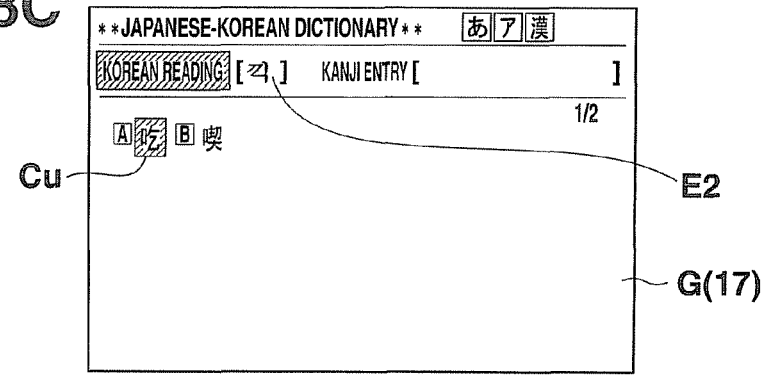
FIG. 8C shows display operation (3) involved in the dictionary search process when the Japanese-Korean dictionary has been selected on the electronic dictionary apparatus 10.

As shown in FIG. 8C, the Japanese kanji characters read in the Korean reading-Japanese kanji extraction process (step SA), that is, the Japanese kanji characters "吃" "喫" corresponding to the Korean kanji characters corresponding to "kiku" in Korean reading are displayed on a Korean reading correspondence Japanese kanji list screen G1 (step S7).

Figure 8D:
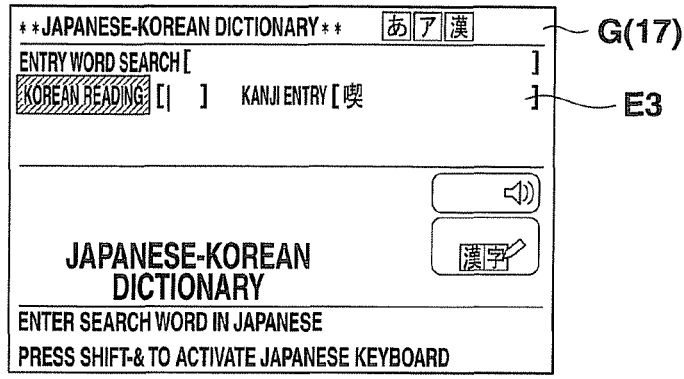
FIG. 8D shows display operation (4) involved in the dictionary search process when the Japanese-Korean dictionary has been selected on the electronic dictionary apparatus 10.

On the Korean reading correspondence Japanese kanji list screen G1, when the highlighted cursor Cu is moved to the first character "喫" in the targeted Japanese kanji word "喫茶店" and the first character is selected, the selected Japanese kanji character "喫" is displayed on the kanji entry area E3 of the search character input screen G as shown FIG. 8D (step S8).

Figure 8E:
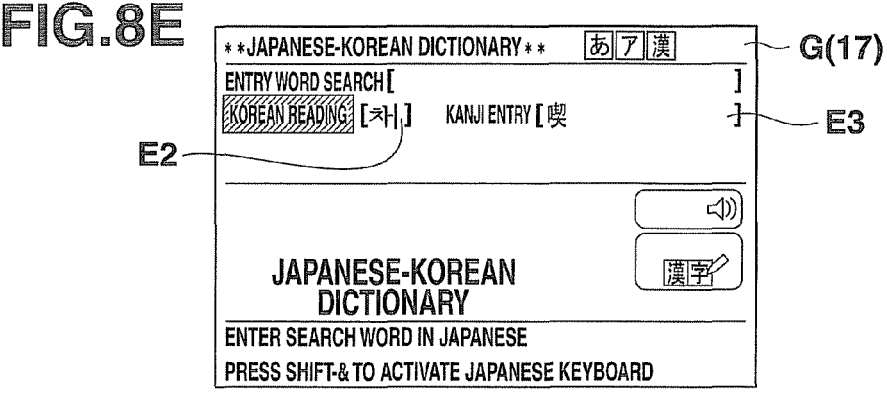
FIG. 8E shows display operation (5) involved in the dictionary search process when the Japanese-Korean dictionary has been selected on the electronic dictionary apparatus 10.

Similarly, as shown in FIG. 8E, the second kanji character "茶" in the Japanese kanji word "喫茶店" to be searched for is entered and displayed in Hangul on the Korean reading input area E2 as "cha" in Korean reading (step S5).

When Translate/Decide key 14c is pressed (YES in step S6), control is passed again to the Korean reading→Japanese kanji extraction process in FIG. 7 (step SA).

Figure 8F:
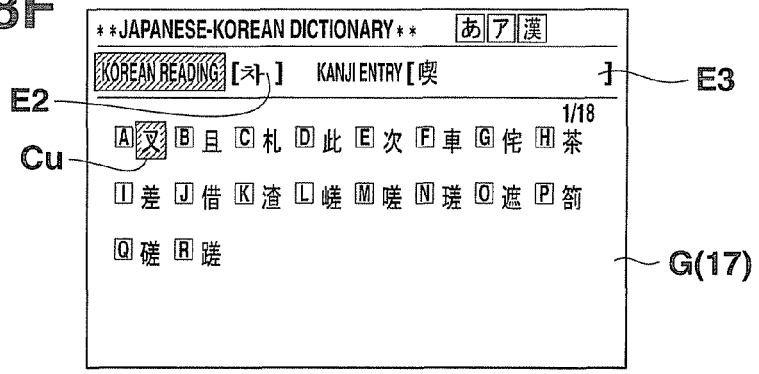
FIG. 8F shows display operation (6) involved in the dictionary search process when the Japanese-Korean dictionary has been selected on the electronic dictionary apparatus 10.

The Japanese kanji characters read in the Korean reading→Japanese kanji extraction process (step SA), that is, the Japanese kanji characters "叉" … "茶" … "差" … "磋" corresponding to the Korean kanji characters corresponding to "cha" in Korean reading are displayed on the Korean reading correspondence Japanese kanji list screen G1 as shown in FIG. 8F (step S7).

Figure 8G:
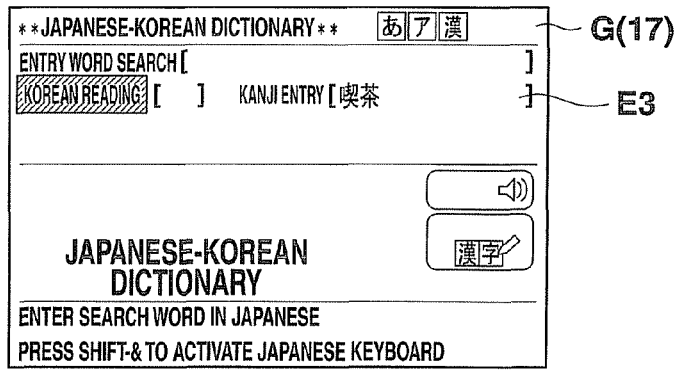
FIG. 8G shows display operation (7) involved in the dictionary search process when the Japanese-Korean dictionary has been selected on the electronic dictionary apparatus 10.

On the Korean reading correspondence Japanese kanji list screen G1, when the highlighted cursor Cu is moved to the second character "茶" in the targeted Japanese kanji word "喫茶店" and the second character is selected, the selected Japanese kanji character "茶" is added to the kanji entry area E3 of the search character input screen G, thereby displaying "喫茶" as shown FIG. 8G (step S8).

Figure 8H:
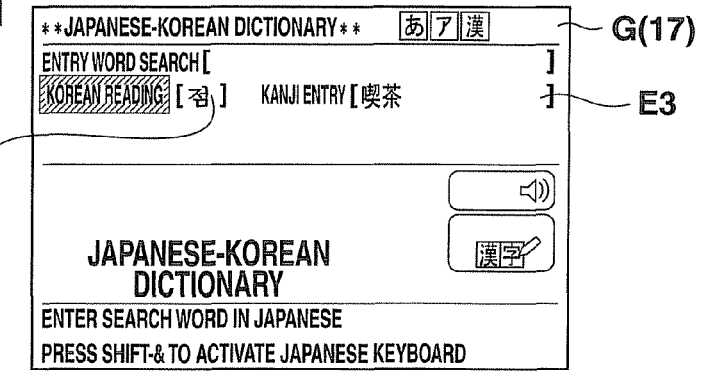
FIG. 8H shows display operation (8) involved in the dictionary search process when the Japanese-Korean dictionary has been selected on the electronic dictionary apparatus 10.
Figure 8:
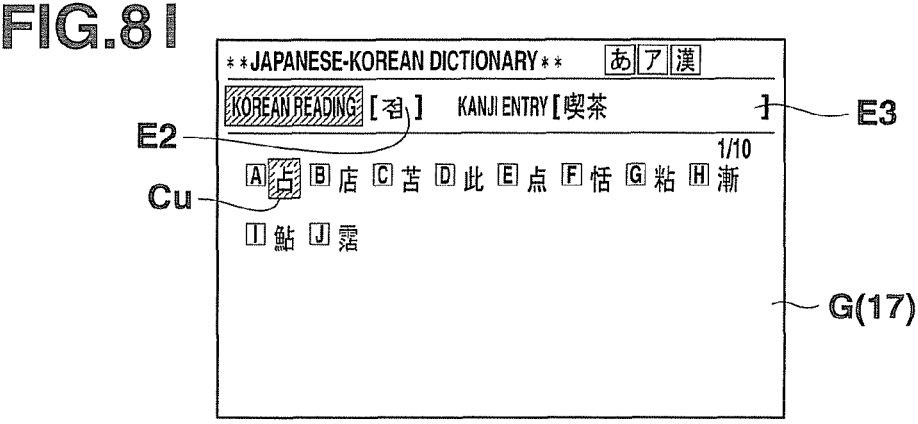
FIG. 8I shows display operation (9) involved in the dictionary search process when the Japanese-Korean dictionary has been selected on the electronic dictionary apparatus 10.
FIG. 8J shows display operation (10) involved in the dictionary search process when the Japanese-Korean dictionary has been selected on the electronic dictionary apparatus 10.
FIG. 8K shows display operation (11) involved in the dictionary search process when the Japanese-Korean dictionary has been selected on the electronic dictionary apparatus 10.

As shown in FIG. 8H, the third kanji character "店" in the Japanese kanji word "喫茶店" to be searched for is entered and displayed in Hangul on the Korean reading input area E2 as "chomu" in Korean reading (step S5).

When Translate/Decide key 14c is pressed (YES in step S6), control is passed again to the Korean reading→Japanese kanji extraction process in FIG. 7 (step SA).

The Japanese kanji characters read in the Korean reading→Japanese kanji extraction process (step SA), that is, the Japanese kanji characters "占" … "店" … "点" … "鮎" corresponding to the Korean kanji characters corresponding to "chomu" in Korean reading are displayed on the Korean reading correspondence Japanese kanji list screen G1 as shown in FIG. 8I (step S7).

Figure 8J:

On the Korean reading correspondence Japanese kanji list screen G1, when the highlighted cursor Cu is moved to the third character "店" in the targeted Japanese kanji word "喫茶店" and the third character is selected, the selected Japanese kanji character "店" is added to the kanji entry area E3 of the search character input screen G, thereby displaying "喫茶店" as shown FIG. 8J (step S8).

Figure 8K:
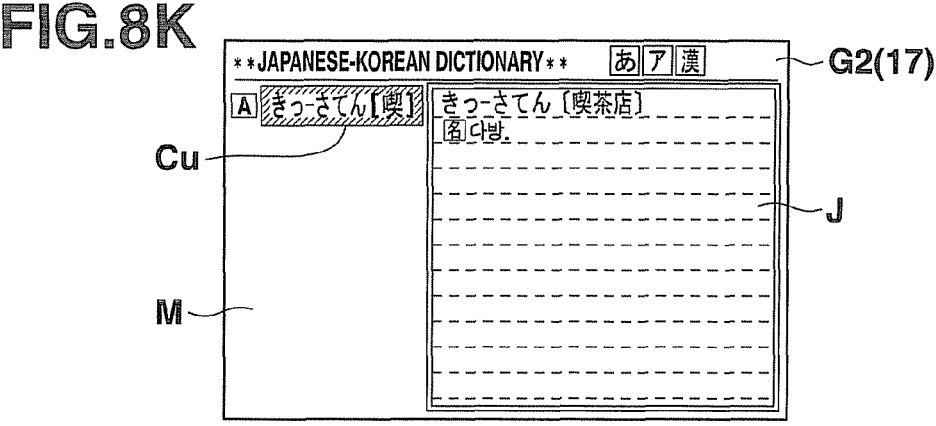

With the targeted Japanese kanji word "喫茶店" being displayed on the kanji entry area E3 according to the input in Hangul on the Korean reading input area E2, when Translate/Decide key 14c is pressed (YES in step S9), an entry word corresponding to the character string of the Japanese kanji word "喫茶店" displayed on the kanji entry area E3 is retrieved from the Japanese-Korean dictionary database 22b1 and displayed on an entry word list area M of an entry word search display screen G2 as "きっさてん ..." as shown in FIG. 8K (step S10).

Explanatory information corresponding to the entry word "きっさてん ..." selected with the highlighted cursor Cu is read from the Japanese-Korean dictionary database 22b1 and displayed on an explanatory information preview area J of the entry word search display screen G2 (step S11).

With the dictionary search function when the Japanese-Korean dictionary has been selected on the electronic dictionary apparatus 10, even when a user whose mother tongue is Korean does not know how to pronounce a Japanese kanji character (word) to be searched for, he or she can easily search for the Japanese word by entering the reading of the kanji character in Korean (Hangul).

Figure 9:
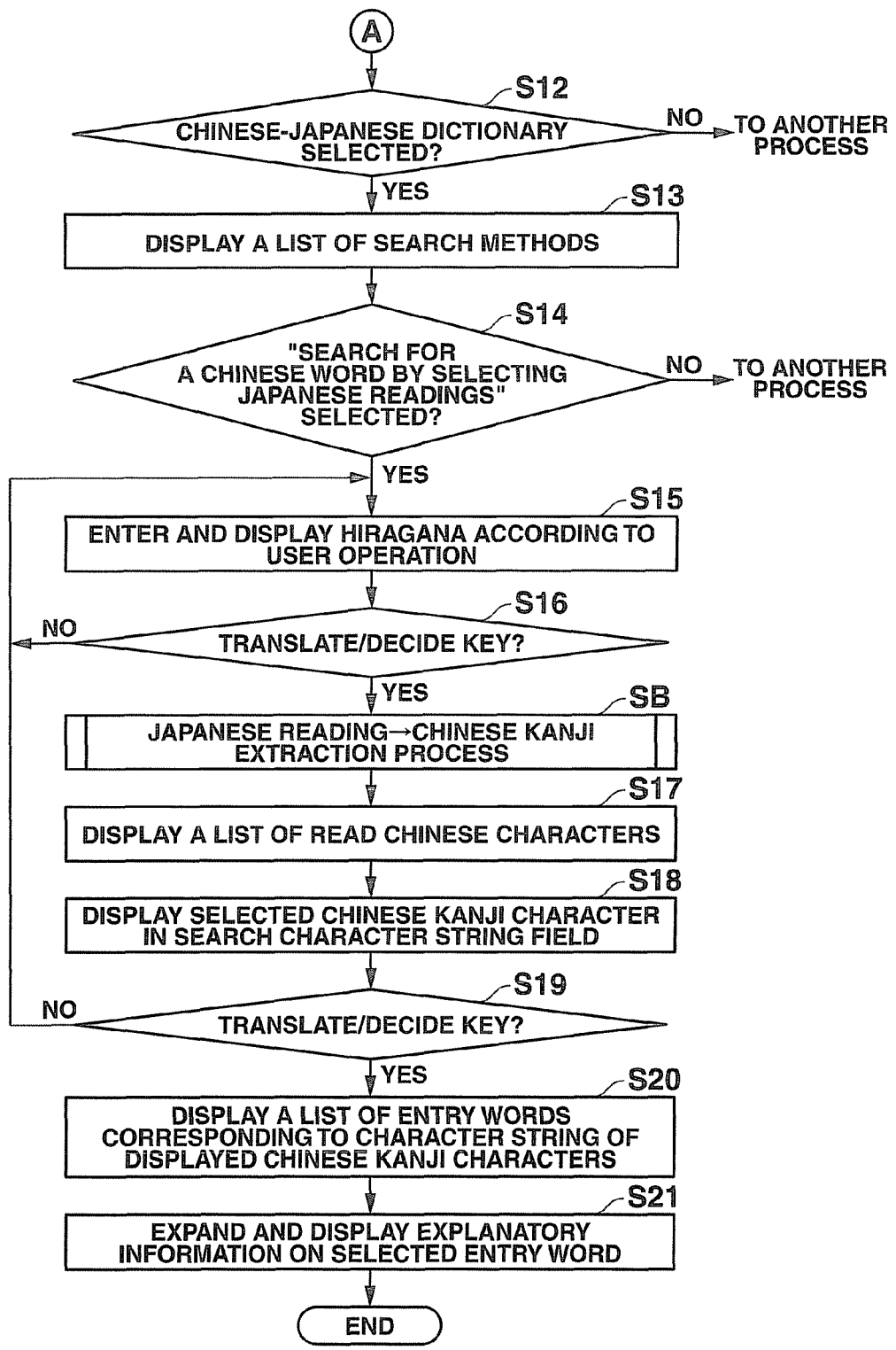
FIG. 9 is a flowchart to explain a dictionary search process when a Chinese-Japanese dictionary has been selected on the electronic dictionary apparatus 10.

FIG. 9 is a flowchart to explain a dictionary search process when a Chinese-Japanese dictionary has been selected on the electronic dictionary apparatus 10.

Figure 10:
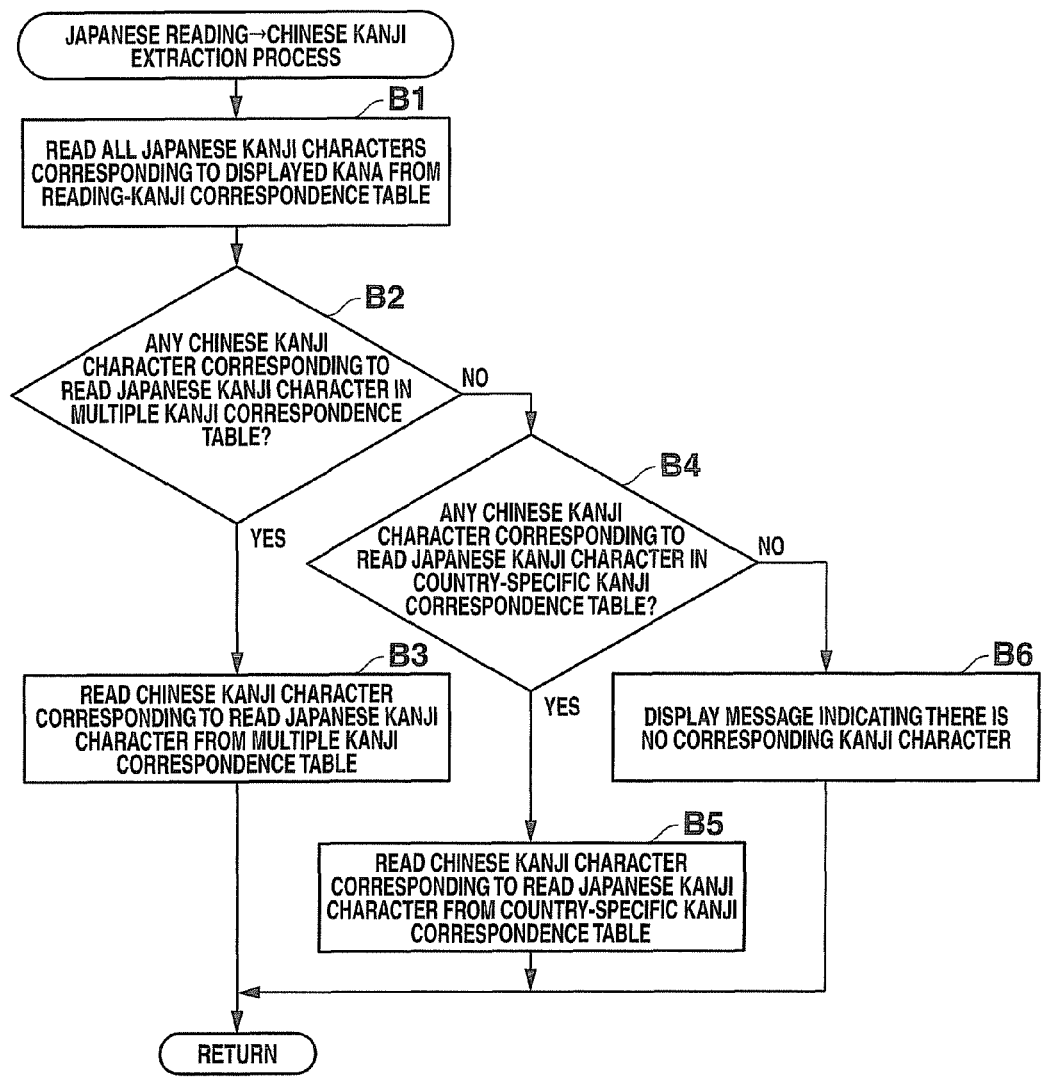
FIG. 10 is a flowchart to explain a Japanese reading→Chinese kanji extraction process involved in the dictionary search process when the Chinese-Japanese dictionary has been selected on the electronic dictionary apparatus 10.

FIG. 10 is a flowchart to explain a Japanese reading→Chinese kanji extraction process involved in a dictionary search process when the Chinese-Japanese dictionary has been selected on the electronic dictionary apparatus 10.

FIGS. 11A to 11H show display operations involved in a dictionary search process when the Chinese-Japanese dictionary has been selected on the electronic dictionary apparatus 10.

A case where a user whose mother tongue is Japanese selects Chinese as a target language and searches for the Chinese word "咖啡舘" the meaning of which the user does not know even when referring to a Chinese-Japanese dictionary will be explained as a concrete example. The Chinese word "咖啡舘" is pronounced in Japanese as "こーひーかん" or "か ひ かん."

Figure 11A:
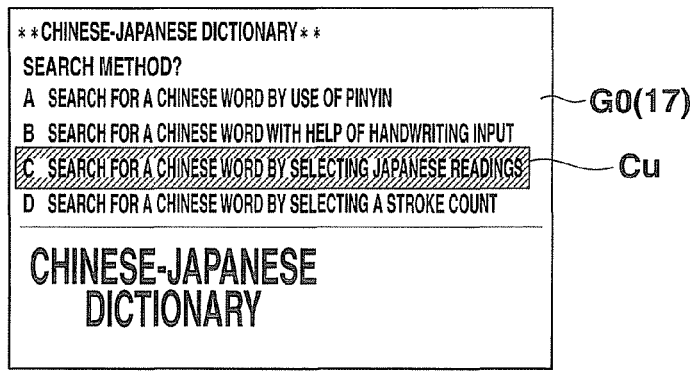
FIG. 11A shows display operation (1) involved in a dictionary search process when the Chinese-Japanese dictionary has been selected on the electronic dictionary apparatus 10.

When the Chinese-Japanese dictionary (22b2) has been selected by pressing the dictionary specify key 14b (step S1, YES in step S12), a Chinese-Japanese dictionary search method list screen G0 is displayed on the touch panel display unit 17 as shown in FIG. 11A (step S13).

Figure 11B:
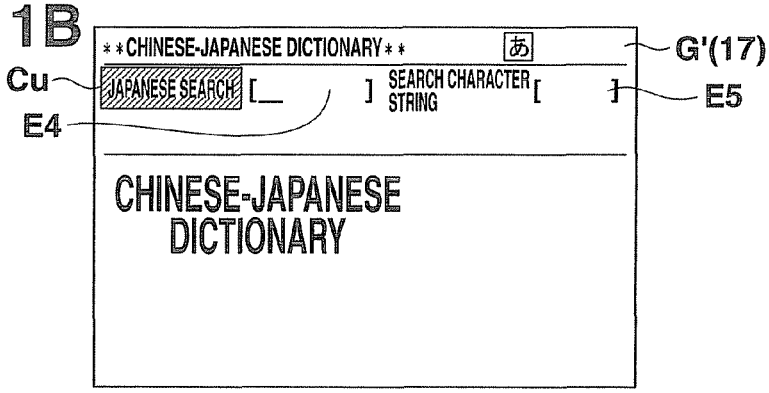
FIG. 11B shows display operation (2) involved in the dictionary search process when the Chinese-Japanese dictionary has been selected on the electronic dictionary apparatus 10.

With the Chinese-Japanese dictionary search method list screen G0 being displayed, when item C for searching for a Chinese word by use of Japanese reading is selected with the highlighted cursor Cu, a Chinese-Japanese dictionary search character input screen G' is displayed on the touch panel display unit 17 as shown in FIG. 11B (step S14). The Chinese-Japanese dictionary search character input screen G' includes a Japanese search input area E4 for entering a word (Chinese kanji characters) to be searched for in Japanese reading and a search character string display area E5 where a search character string of the Chinese characters corresponding to the Japanese reading of the search characters input on the Japanese search input area E4 is displayed.

Figure 11C:
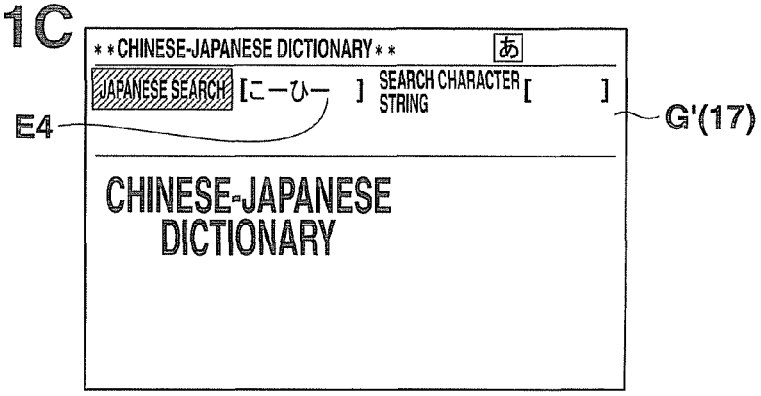
FIG. 11C shows display operation (3) involved in the dictionary search process when the Chinese-Japanese dictionary has been selected on the electronic dictionary apparatus 10.

On the search character input screen G', the Japanese search input area E4 is selected with the highlighted cursor Cu as shown in FIG. 11C, thereby entering and displaying the first two kanji characters "咖啡" in the targeted Chinese word "咖啡舘" in Japanese reading as "こーひー" in hiragana (or katakana) (step S15).

When Translate/Decide key 14c is pressed (YES in step S16), control is passed to a Japanese reading→Chinese kanji extraction process in FIG. 10 (step SB).

In the Japanese reading→Chinese kanji extraction process, first, all of the Japanese kanji characters corresponding to "こーひー" in Japanese reading entered and displayed on the Japanese search input area E4 are read from the Japanese reading-kanji correspondence table 22dj (see FIG. 4A) (step B1).

It is determined whether a Chinese kanji character corresponding to the Japanese kanji characters read from the Japanese reading-kanji correspondence table 22dj is in the multiple kanji correspondence table 22e (see FIG. 5) (step B2).

Since the Japanese kanji word corresponding to "こーひー" in Japanese reading read from the Japanese reading-kanji correspondence table 22dj is "珈琲", it is determined that the Chinese kanji phrase "咖啡" corresponding to the word is in the multiple kanji correspondence table 22e (YES in step B2). Then, the Chinese kanji phrase "咖啡" corresponding to the Japanese kanji word "珈琲" read from the multiple kanji correspondence table 22e is read (step B3).

In step B2, if it has been determined that the Japanese kanji word read from the Japanese reading-kanji correspondence table 22dj is composed of a single kanji character and there is no Chinese phrase corresponding to the single kanji character in the multiple kanji correspondence table 22e (NO in step B2), it is determined whether there is any Chinese kanji character corresponding to the read Japanese kanji character in the country-specific kanji correspondence table 22c (see FIG. 3) (step B4).

If it has been determined that there is a Chinese kanji character corresponding to the read Japanese kanji character in the country-specific kanji correspondence table 22c (YES in step B4), the Chinese kanji character corresponding to the read Japanese kanji character is read from the country-specific kanji correspondence table 22c (step B5).

If it has been determined that the Chinese kanji character corresponding to the read Japanese kanji character is in neither the multiple kanji correspondence table 22e nor the country-specific kanji correspondence table 22c (NO in steps B2 and B4), the message that there is no corresponding Chinese kanji character is displayed (step B6).

Figure 11D:
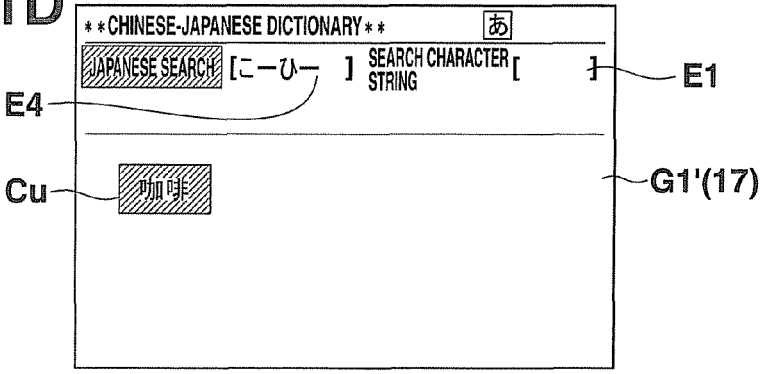
FIG. 11D shows display operation (4) involved in the dictionary search process when the Chinese-Japanese dictionary has been selected on the electronic dictionary apparatus 10.

As shown in FIG. 11D, the Chinese kanji characters read in the Japanese reading-Chinese kanji extraction process (step SB), that is, the Chinese kanji characters "咖啡" corresponding to the Japanese kanji characters "珈琲" corresponding to "こーひー" in Japanese reading are displayed on a Japanese reading correspondence Chinese kanji list screen G1' (step S17).

Figure 11E:
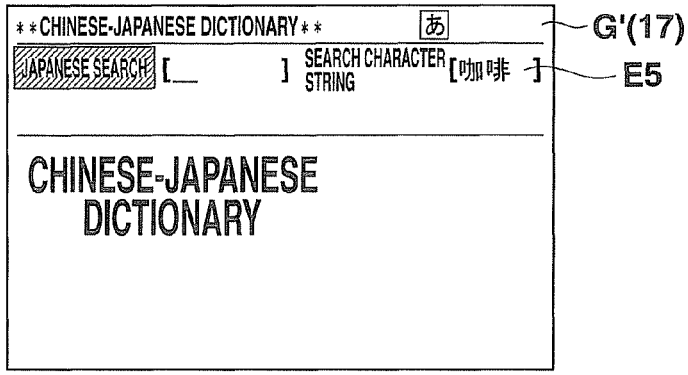
FIG. 11E shows display operation (5) involved in the dictionary search process when the Chinese-Japanese dictionary has been selected on the electronic dictionary apparatus 10.

On the Japanese reading correspondence Chinese kanji list screen G1', when the highlighted cursor Cu is moved to the characters "舘" in the targeted Chinese kanji word "咖啡舘" and the characters are selected, the selected Chinese kanji characters "珈琲" are displayed on the search character string display area E5 of the search character input screen G' as shown FIG. 11E (step S18).

Figure 11F:
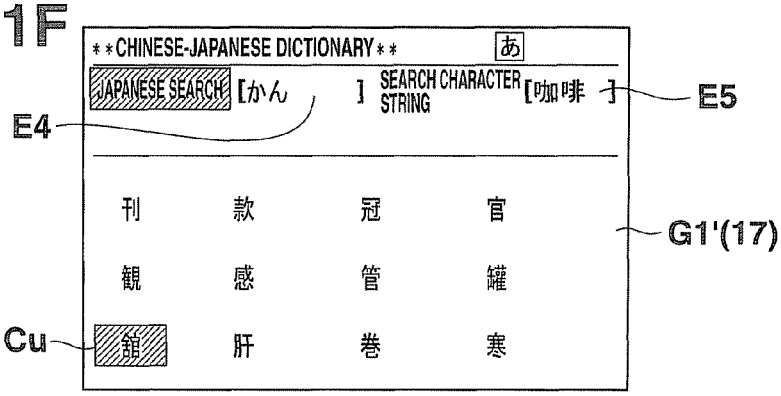
FIG. 11F shows display operation (6) involved in the dictionary search process when the Chinese-Japanese dictionary has been selected on the electronic dictionary apparatus 10.

Similarly, as shown in FIG. 11F, the third kanji character "舘" in the Chinese kanji word "咖啡舘" to be searched for is entered and displayed in hiragana on the Japanese search input area E4 as "かン" in Japanese reading (step S15).

When Translate/Decide key 14c is pressed (YES in step S16), control is passed again to the Japanese reading→Chinese kanji extraction process in FIG. 10 (step SB).

Then, the Chinese kanji characters read in the Japanese reading→Chinese kanji extraction process (step SB), that is, the Chinese kanji characters "刊" ... "官" ... "感" ... "舘" ... "寒" corresponding to the Japanese kanji characters corresponding to "かン" in Japanese reading are displayed on the Japanese reading correspondence Chinese kanji list screen G1' as shown in FIG. 11F (step S17).

Figure 11G:
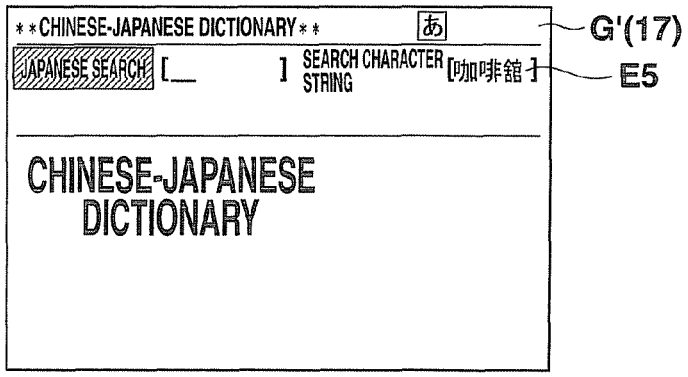
FIG. 11G shows display operation (7) involved in the dictionary search process when the Chinese-Japanese dictionary has been selected on the electronic dictionary apparatus 10.

On the Japanese reading correspondence Chinese kanji list screen G1', when the highlighted cursor Cu is moved to the third character "舘" in the targeted Chinese kanji word "咖啡舘" and the third character is selected, the selected Chinese kanji character "舘" is added to the search character string display area E5 of the search character input screen G', thereby displaying "咖啡舘" as shown FIG. 11G (step S18).

Figure 11H:
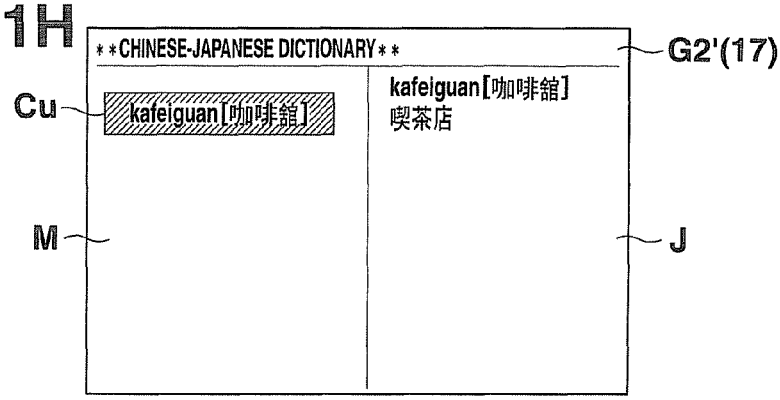
FIG. 11H shows display operation (8) involved in the dictionary search process when the Chinese-Japanese dictionary has been selected on the electronic dictionary apparatus 10.

With the targeted Chinese kanji word "咖啡舘" being displayed on the search character string display area E5 according to the input in Japanese reading (hiragana) on the Japanese search input area E4, when Translate/Decide key 14c is pressed (YES in step S19), an entry word corresponding to the character string of the Chinese kanji word "咖啡舘" displayed on the search character string display area E5 is retrieved from the Chinese-Japanese dictionary database 22b2 and displayed on an entry word list area M of an entry word search display screen G2' as "kafeiguan [咖啡舘]" as shown in FIG. 11H (step S20).

Explanatory information corresponding to the entry word "kafeiguan [咖啡舘]" selected with the highlighted cursor Cu is read from the Chinese-Japanese dictionary database 22b2 and displayed on an explanatory information preview area J of the entry word search display screen G2' (step S21).

Accordingly, with the dictionary search function when the Chinese-Japanese dictionary has been selected on the electronic dictionary apparatus 10, even when a user whose mother tongue is Japanese does not know how to pronounce the targeted Chinese kanji characters (word) in Chinese, he or she can easily search for the Chinese word by entering the readings of the kanji characters in Japanese (hiragana).

In the embodiment, a case where a user whose mother tongue is Korean searches for a Japanese kanji word and a case where a user whose mother tongue is Japanese searches for a Chinese kanji word have been explained. It is, of course, possible to combine the user's mother tongue and the language of a targeted kanji character (or word) arbitrarily in Japanese, Chinese, and Korean by performing the dictionary search process as described above.

Even when a user whose mother tongue is Japanese searches for a Japanese kanji phrase difficult to read, he or she can search for the phrase by entering the kanji character in the phrase one by one in hiragana.

This makes it possible to enter and search for non-Japanese kanji characters even without a handwritten character recognition function.

Any of the processing methods by the electronic dictionary apparatus 10 and the dictionary databases (22b to 22e) described in the embodiment can be stored in external storage media 23 in the form of a program executable on a computer. Then, the external storage media 23 may be distributed.

The processing methods by the electronic dictionary apparatus 10 include the dictionary search process when the Japanese-Korean dictionary has been selected as described in the flowchart of FIG. 6, the Korean reading→Japanese kanji extraction process involved in the dictionary search process when the Japanese-Korean dictionary has been selected as described in the flowchart of FIG. 7, the dictionary search process when the Chinese-Japanese dictionary has been selected as described in the flowchart of FIG. 9, and the Japanese reading→Chinese kanji extraction process involved in the dictionary search process when the Chinese-Japanese dictionary has been selected as described in the flowchart of FIG. 10.

The external storage media 23 include, for example, a memory card (e.g., a ROM card or RAM card), a magnetic disk (e.g., a floppy disk or hard disk), an optical disk (e.g., a CD-ROM or DVD), or a semiconductor memory.

The computer can load the program stored in the external storage medium 23 into the storage unit 22. The computer is controlled by the loaded program, thereby realizing the dictionary search function by reading a target language's kanji character (or word) in the user's mother tongue when kanji characters are used in different languages as described in the embodiment. Accordingly, it is possible to carry out the same processes by the aforementioned methods.

Furthermore, the data of the programs which realize the above methods can be transferred in the form of program code through a network N. A computer connected to the network N takes in the program data via the communication control unit 25, thereby realizing the dictionary search function by reading a target language's kanji character (or word) in the user's mother tongue when kanji characters are used in the different languages as described above.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
a display device;
an input unit; a storage which includes:
dictionary information that causes an entry word in a first language to correspond to explanatory information in a second language which is a language different from the first language,
reading-kanji correspondence information that causes a kanji character in the second language to correspond to a reading in the second language, and
kanji correspondence information that causes a kanji character in the first language to correspond to a kanji character in the second language;
a processor which
accepts the input of a reading in the second language via the input unit, reads a kanji character in the second language corresponding to the input reading in the second language from the reading-kanji correspondence information stored in the storage, reads a kanji character in the first language corresponding to the read kanji character in the second language from the kanji correspondence information stored in the storage and performs display control of the read kanji character on the display device, and reads explanatory information that uses a character string including the kanji character in the first language subjected to display control as an entry word from dictionary information stored in the storage and performs display control of the explanatory information on the display device;

wherein the storage further includes multiple kanji correspondence information that causes a plurality of kanji kanji characters in the first language to correspond to a plurality of kanji characters in the second language, and the processor reads a kanji character in the second language corresponding to the reading in the second language input via the input unit from the reading-kanji correspondence information stored in the storage and determines whether the kanji character in the second language is in the plurality of kanji characters included in the multiple kanji correspondence information stored in the storage, reads the plurality of kanji characters in the first language corresponding to the plurality of kanji characters in the second language from the multiple kanji correspondence information and performs display control of the read kanji characters on the display device, if it has been determined that the kanji character in the second language is in the plurality of kanji characters included in the multiple kanji correspondence information, and reads a kanji character in the first language corresponding to the kanji character in the second language from the kanji correspondence information stored in the storage and performs display control of the read kanji character on the display device, if it has been determined that the kanji character in the second language is not in the plurality of kanji characters included in the multiple kanji correspondence information.

2. The electronic apparatus according to claim 1, wherein each of the first language and the second language is any one of Japanese, Korean, and Chinese.

3. The electronic apparatus according to claim 1, wherein each of the first language and the second language is any one of Japanese, Korean, and Chinese.

4. An electronic apparatus-comprising:

a display device;

an input unit;

a dictionary storage which stores dictionary information that causes an entry word in a first language to correspond to explanatory information in a second language which is a language different from the first language;

a reading-kanji correspondence storage which stores reading-kanji correspondence information that causes a kanji character in the second language to correspond to a reading in the second language;

a kanji correspondence storage which stores kanji correspondence information that causes a kanji character in the first language to correspond to a kanji character in the second language;

a second-language reading input section which takes in a reading in the second language via the input unit;

a first language kanji display section which reads a kanji character in the second language corresponding to the reading in the second language input by the second language reading input section from the reading-kanji correspondence information stored in the reading-kanji correspondence storage, then reads a kanji character in the first language corresponding to the kanji character in the second language from the kanji correspondence information stored in the kanji correspondence storage, and performs display control of the read kanji character on the display device; and a dictionary information display section which reads explanatory information that uses a character string including the kanji character in the first language subjected to display control at the first-language kanji display section as an entry word from dictionary information stored in the dictionary storage and performs display control of the explanatory information on the display device;

a multiple kanji correspondence storage which stores multiple kanji correspondence information that causes a plurality of kanji characters in the first language to correspond to a plurality of kanji characters in the second language, wherein the first-language kanji display section reads a kanji character in the second language corresponding to the reading in the second language input by the second-language reading input section from the reading-kanji correspondence information stored in the reading kanji correspondence storage and determines whether the read kanji character in the second language is in the plurality of kanji characters included in the multiple kanji correspondence information stored in the multiple kanji correspondence storage, reads the plurality of kanji characters in the first language corresponding to the plurality of kanji characters in the second language from the multiple kanji correspondence information stored in the multiple kanji correspondence storage and performs display control of the read kanji characters on the display device if it has been determined that the kanji character in the second language read from the reading-kanji correspondence information is in the plurality of kanji characters included in the multiple kanji correspondence information stored in the multiple kanji correspondence storage, and reads a kanji character in the first language corresponding to the kanji character in the second language from the kanji correspondence information stored in the kanji correspondence storage and performs display control of the read kanji character on the display device, if it has been determined that the kanji character in the second language read from the reading-kanji correspondence information is not in the plurality of kanji characters included in the multiple kanji correspondence information stored in the multiple kanji correspondence storage.

5. The electronic apparatus according to claim 4, wherein each of the first language and the second language is any one of Japanese, Korean, and Chinese.

6. The electronic apparatus according to claim 4, wherein each of the first language and the second language is any one of Japanese, Korean, and Chinese.

7. A non-transitory computer-readable medium which stores a software program that is executed by a computer system with a display device and that comprises a series of instructions to cause the computer system to perform the following processes comprising:

accepting the input of a reading in a second language;

reading a kanji character in the second language corresponding to the input reading in the second language from information that causes the kanji character in the second language to correspond to the reading in the second language;

reading a kanji character in a first language which is a language different from the second language corresponding to the read kanji character in the second language from information that causes the kanji character in the first language to correspond to the kanji character in the second language and performing display control of the read kanji character on the display device; and reading explanatory information that uses a character string including the kanji character in the first language subjected to display control as an entry word from information that causes the entry word in the first language to correspond to explanatory information in the second language and performing display control of the explanatory information on the display device;

storing multiple kanji correspondence in a multiple kanji correspondence storage, information that causes a plurality of kanji characters in the first language to correspond to a plurality of kanji characters in the second language, reading a kanji character in the second language corresponding to the reading in the second language input by the second-language reading input from the reading-kanji correspondence information stored in the reading kanji correspondence storage and determines whether the read kanji character in the second language is in the plurality of kanji characters included in the multiple kanji correspondence information stored in the multiple kanji correspondence storage, reading the plurality of kanji characters in the first language corresponding to the plurality of kanji characters in the second language from the multiple kanji correspondence information stored in the multiple kanji correspondence storage and performing display control of the read kanji characters on a display device if it has been determined that the kanji character in the second language read from the reading-kanji correspondence information is in the plurality of kanji characters included in the multiple kanji correspondence information stored in the multiple kanji correspondence storage, and reading a kanji character in the first language corresponding to the kanji character in the second language from the kanji correspondence information stored in the kanji correspondence storage and performing display control of the read kanji character on the display device, if it has been determined that the kanji character in the second language read from the reading-kanji correspondence information is not in the plurality of kanji characters included in the multiple kanji correspondence information stored in the multiple kanji correspondence storage.

* * * * *